United States Patent
Miyata

(10) Patent No.: US 8,299,736 B2
(45) Date of Patent: Oct. 30, 2012

(54) METHOD OF MAKING A MOTOR WITH REDUCED COGGING TORQUE

(75) Inventor: Koji Miyata, Takefu (JP)

(73) Assignee: Shin-Etsu Chemical Co., Ltd. (JP)

( * ) Notice: Subject to any disclaimer, the term of this patent is extended or adjusted under 35 U.S.C. 154(b) by 39 days.

(21) Appl. No.: 13/093,151

(22) Filed: Apr. 25, 2011

(65) Prior Publication Data
US 2011/0192018 A1 Aug. 11, 2011

Related U.S. Application Data

(62) Division of application No. 11/205,523, filed on Aug. 17, 2005, now Pat. No. 7,948,136.

(30) Foreign Application Priority Data

Aug. 20, 2004 (JP) .................................. 2004-240222

(51) Int. Cl.
*H02P 6/10* (2006.01)
*H02P 6/00* (2006.01)
*H02K 21/12* (2006.01)
*H02K 15/00* (2006.01)

(52) U.S. Cl. ................... 318/400.23; 318/432; 318/701; 310/156.45; 310/156.46; 29/596

(58) Field of Classification Search ............. 318/400.23, 318/432, 701; 310/156.45, 156.46; 29/596
See application file for complete search history.

(56) References Cited

U.S. PATENT DOCUMENTS 4,620,139 A * 10/1986 Egami et al. ............. 318/400.01
4,751,416 A 6/1988 Török (Continued)

FOREIGN PATENT DOCUMENTS
JP 62110468 5/1987
(Continued)

OTHER PUBLICATIONS

Bianchi et al. "Reducing Torque Ripple in PM Synchronous Motors by Pole Shifting", *ICEM* pp. 1222-1226 (2000).

(Continued)

*Primary Examiner* — Bentsu Ro
*Assistant Examiner* — Gabriel Agared
(74) *Attorney, Agent, or Firm* — Myers Bigel Sibley & Sajovec, PA

(57) ABSTRACT

To reduce the cogging torque of servomotors, electric power steering motors, and others, there is provided a permanent magnet motor comprising: a rotor 10 comprising a rotor yoke 11 and a plurality of permanent magnets (M1-M10); and a stator 20 comprising a stator yoke 22, salient magnetic poles 21, and armature windings 23, wherein at least one of the permanent magnets is disposed in an adjustment position that is displaced from a corresponding reference position in at least one of the circumferential, radial, and axial directions of the rotor yoke, and the plurality of permanent magnets excluding the permanent magnet disposed in the adjustment position is disposed in the reference positions, and wherein the adjustment position is set so that the permanent magnet motor in which at least one of the plurality of permanent magnets is disposed in the adjustment position has a smaller cogging torque than a permanent magnet motor in which all of the plurality of permanent magnets are disposed in the reference positions; and a method for adjusting a cogging torque of a permanent magnet motor.

6 Claims, 8 Drawing Sheets

U.S. PATENT DOCUMENTS

| | | | |
|---|---|---|---|
| 4,769,567 | A | 9/1988 | Kurauchi et al. |
| 4,950,960 | A * | 8/1990 | Krefta et al. ............... 318/400.2 |
| 4,998,032 | A | 3/1991 | Burgbacher |
| 5,289,064 | A * | 2/1994 | Sakamoto ................. 310/49.53 |
| 5,801,463 | A * | 9/1998 | Suzuki et al. ................... 310/51 |
| 5,903,080 | A * | 5/1999 | Nashiki et al. ............... 310/168 |
| 6,222,288 | B1 | 4/2001 | Benito Izquierdo |
| 6,285,104 | B1 * | 9/2001 | Nashiki ........................ 310/184 |
| 6,853,106 | B2 | 2/2005 | Fujiwara et al. |
| 6,858,960 | B1 | 2/2005 | Muszynski |
| 7,119,470 | B2 * | 10/2006 | Tajima et al. ............ 310/156.53 |
| 2004/0124728 | A1 | 7/2004 | Yamaguchi et al. |
| 2005/0162029 | A1 * | 7/2005 | Tajima et al. ............ 310/156.53 |
| 2005/0168089 | A1 * | 8/2005 | Miyashita et al. ....... 310/156.57 |
| 2006/0038457 | A1 | 2/2006 | Miyata |
| 2006/0103251 | A1 * | 5/2006 | Taniguchi et al. ....... 310/156.01 |

FOREIGN PATENT DOCUMENTS

| | | |
|---|---|---|
| JP | 02276430 | 11/1990 |
| JP | 07107687 | 4/1995 |
| JP | 2002-10546 | 1/2002 |
| JP | 2004072869 A | 3/2004 |
| WO | WO 2004/070921 A1 | 8/2004 |

OTHER PUBLICATIONS

Borghi et al. "Reduction of the Torque Ripple in Permanent Magnet Actuators by a Multi-Objective Minimization Technique", *IEEE Transactions on Magnetics* 34(5):2869-2872 (1998).

Studer et al. "Study of Cogging Torque in Permanent Magnet Machines", *IEE IAS Annual Meeting* pp. 42-49 (1997).

Daikoku et al. "Measurement of Cogging Torque Resulting from Non-oriented Steel's Magnetic Anisotropy in Permanent Magnet Motors", *2003 National Convention of the Institute of Electrical Engineers in Japan* 5-016.

Partial European Search Report corresponding to application No. EP 05018092.6, dated Feb. 27, 2006.

Japanese Office Action corresponding to Japanese application No. JP 2004-240222, dated Apr. 27, 2007.

European Examination Report for European Patent Application No. 05018092.6, dated Mar. 12, 2009 (6 pages).

* cited by examiner

(RELATED ART/COMPARATIVE EXAMPLE)

(RELATED ART/COMPARATIVE EXAMPLE)

METHOD OF MAKING A MOTOR WITH REDUCED COGGING TORQUE

CROSS-RELATED APPLICATIONS

This application is a divisional application of U.S. patent application Ser. No. 11/205,523 filed Aug. 17, 2005, now U.S. Pat. No. 7,948,136 now allowed, which claims priority from Japanese Patent Application No. 2004-240222; filed Aug. 20, 2004, the disclosures of which are incorporated herein by reference in their entireties.

BACKGROUND OF THE INVENTION

The present invention relates to permanent magnet motors, and specifically to permanent magnet motors for servomotors and electric power steering motors etc., with reduced cogging torque.

There has been a demand for miniaturized and low-loss servomotors and electric power steering motors, and by employing a motor in which armature windings are concentratedly wound around respective salient magnetic poles of a stator, the amount of the windings that extend beyond an end portion of the stator is reduced, and thus the length of the motor and copper loss in the windings are reduced. Also, there has been a strong demand for reducing the cogging torque of motors in order to improve positioning accuracy and to reduce noise and vibrations.

As a method for reducing the cogging torque of a concentrated winding permanent magnet motor, Japanese Patent No. 2135902, which is herein incorporated by reference, describes a method in which the relationship between the number P of poles of a rotor and the number M of salient stator poles is made to satisfy $P=6n\pm2$ and $M=6n$, wherein n is an integer of 2 or more, or $P=3m\pm1$ and $M=3m$, wherein m is an odd number of 3 or more. The permanent magnet motor has a cogging torque that pulsates, the number of which is the least common multiple of the number P of poles and the number M of salient poles per revolution of the rotor, and the magnitude of the cogging torque decreases as the number of pulsations increases. Based on this principle, the permanent magnet motor has the combination of the number P of poles and the number M of salient poles such that the least common multiple of the number P of poles of the rotor and the number M of salient poles of the stator increases under the condition that a three-phase winding connection is possible. Table 1 shows a summary of specific combinations of the number P of poles and the number M of salient poles.

TABLE 1

| | Number of poles P | Number of salient poles M | Number of cogging torque pulsations |
|---|---|---|---|
| n | | | |
| 2 | 10, 14 | 12 | 60, 84 |
| 3 | 16, 20 | 18 | 144, 180 |
| m | | | |
| 3 | 8, 10 | 9 | 72, 90 |
| 5 | 14, 16 | 15 | 210, 240 |

A permanent magnet motor having the combination of $P=10$ and $M=12$ shown in Table 1 was designed. FIG. 11 shows a schematic cross-sectional view of the permanent magnet motor having 10 poles and 12 slots, in a plane perpendicular to the axis of the permanent magnet motor. In FIG. 11, the motor includes: a rotor 10 in which ten neodymium magnets (M1 to M10) having a residual magnetic flux density of 1.26 Tesla are disposed on a rotor yoke 11 made of low carbon steel S45C at even intervals such that the polarities of the magnets alternate in the circumferential direction; and a stator 20 having a stator yoke 22 that is opposed to the permanent magnets and that is formed from an isotropic silicon steel sheet 35A300 on which twelve salient magnetic poles 21 are disposed at even intervals in the circumferential direction, ten-turn armature windings 23, which are wound around the magnetic poles and which are serially connected in each of the U, V and W phases that are three-phase connected. In FIG. 11, the direction of magnetization of the permanent magnets is indicated by an arrow in each permanent magnet. Moreover, at the center of the rotor, the direction of revolution of the rotor is indicated by an arrow. The permanent magnets have a shape in which the thickness of the permanent magnets is reduced at both end portions. FIG. 12 shows a specific shape of the permanent magnets. In FIG. 12, Ri=23 mm, Ro=10 mm, D=15 mm, and W=12 mm. By reducing the thickness of a permanent magnet at both end portions, the distribution of the magnetic flux density at an air gap is smoothed, and thus an effect of reducing the cogging torque is achieved. The rotor and the stator have a length of 40 mm in the axial direction, and the air gap between the rotor magnets and the stator magnetic poles is 1 mm. In FIG. 11, symbols shown in the windings indicate the directions of the windings: a solid circle (●) indicates the direction emerging from the paper surface and a cross (×) indicates the direction entering the paper surface. The rated torque was set to be 2 Nm (newton meter) when the motor is driven with a sinusoidal current having an effective value of 20 A (ampere).

The cogging torque of the above-described permanent magnet motor was calculated assuming that there was no variation in the characteristics and the dimensions of the magnets and that all factors were in an ideal state. It was found that the cogging torque had a waveform having a peak value of 0.0003 Nm and 60 pulsations per revolution of the rotor. Since the cogging torque is expressed as the difference between the maximum and the minimum points of the waves, in this case, the cogging torque was 0.0006 Nm, which was 0.03% of the rated value, that is, a very small value. In the case of permanent magnet motors such as for electric power steering, a weak cogging torque affects the steering feel, so it is desirable that the cogging torque is no greater than 0.5% of the rated torque (in the present case, no greater than 0.01 Nm).

Next, as Comparative Example 1, the designed motor was actually fabricated, and the cogging torque of that motor was measured. Neodymium magnets were used as the permanent magnets, which were made by filling a die having a Japanese roof tile-like shape with magnet powder, pressing the die in a transverse magnetic field, sintering the pressed magnetic powder, and subjecting the sintered product to heating and which were then ground to precision of 0.05 mm or less using a whetstone. Moreover, a dedicated jig was prepared to position the permanent magnets on the rotor yoke, and the positioning was performed with a precision of 0.05 mm or less. The stator yoke was made by laser cutting out pieces of 0.35 mm silicon steel sheet to a predetermined shape, and laminating the pieces with a laminating method, referred to as "parallel laminating method", in which the pieces are laminated with their rolling directions in a uniform direction. After the lamination, the pieces were fastened at eight points on a peripheral portion of the stator yoke by laser welding, and the inner surface of the stator yoke opposed to the permanent magnets was ground to increase dimensional accuracy.

FIG. 13 shows an actually-measured waveform of the cogging torque of the permanent magnet motor according to Comparative Example 1 (parallel-laminated stator). The measured cogging torque waveform according to Comparative Example 1 was a waveform having 10 pulsations per revolution of the rotor. The entire waveform is shifted to the negative side due to a force working against revolution, which is called "loss torque". This is caused by the hysteresis loss of the stator yoke. Since the cogging torque is expressed as the difference between the maximum and the minimum points of the waves, the cogging torque of Comparative Example 1 shown in FIG. 13 was 0.0274 Nm. FIG. 14 shows the results of a Fourier analysis in which the cogging torque waveform according to Comparative Example 1 was divided into components of respective orders of the waveform. Here, "order" is the number of pulsations that appear during one revolution of the rotor. For example, "duodenary component" is a component having twelve pulsations during one revolution of the rotor. Regarding the components of the cogging torque of Comparative Example 1 shown in FIG. 13, the denary component is 0.0061 Nm, the duodenary component is 0.0077 Nm, the vigenary component is 0.0016 Nm, and the twenty-fourth order component is 0.0007 Nm. It should be noted that the order components shown in FIG. 14 represent the peak values of the respective order components, which are values half the cogging torque. Checking the order components of the cogging torque waveform makes it possible to know what the cogging torque is attributed to. In the case of the permanent magnet motor according to Comparative Example 1, it is believed that the denary, vigenary, and thirtieth order components, whose orders correspond to multiples of the number of poles, are caused by variations in the stator yoke, and the duodenary, twenty-fourth order, and thirty-sixth order components, whose orders correspond to multiples of the number of salient poles, are caused by variations in the permanent magnets. If there is no variation in the permanent magnets, the positional relationship between the stator yoke and the permanent magnets has rotational symmetry with respect to the magnetic pole pitch angle, so that the cogging torque caused by variations in the stator yoke has a waveform in which the number of cycles of the fundamental wave corresponds to the number of poles per revolution. Similarly, if there is no variation in the stator, the positional relationship between the stator and the magnets has rotational symmetry with respect to the salient pole pitch angle, so that the cogging torque caused by variations in the magnets has a waveform in which the number of cycles of the fundamental wave corresponds to the number of salient poles per revolution. The sixtieth order, which corresponds to the least common multiple of the number of poles and the number of salient poles, is the cogging torque when the permanent magnet motor was an ideal permanent magnet motor. The cogging torque of Comparative Example 1 shown in FIG. 13 has large components of orders of multiples of 10. Since even an isotropic steel sheet has some magnetic anisotropy in the rolling direction, when the stator yoke is made by the parallel laminating method in which rolling directions of the pieces are made uniform, the magnetic anisotropy remains. It appears that the influence of this residual magnetic anisotropy causes the cogging torque.

In order to eliminate the magnetic anisotropy of the stator yoke, in "Measurement of Cogging Torque of Permanent Magnet Motor Due to Magnetic Anisotropy of Non-oriented Electrical Steel Sheet", Proceedings of the National Convention of the Institute of Electrical Engineers of Japan, 5-016., which is herein incorporated by reference, a method in which lamination is performed such that the rolling direction successively rotates, which is called "rotational laminating method", is used. As Comparative Example 2, a permanent magnet motor having a rotational-laminated stator was fabricated. The rotor and the method for making the stator yoke except for the laminating method were the same as in Comparative Example 1. FIG. 15 shows an actually-measured waveform of the cogging torque of the permanent magnet motor according to Comparative Example 2 (rotational-laminated stator). Moreover, FIG. 14 also shows the results of a Fourier analysis in which the cogging torque waveform according to Comparative Example 2 was divided into components of respective orders of the waveform. In Comparative Example 2, as compared to Comparative Example 1, the denary, vigenary, and thirtieth order components were significantly reduced to less than 0.0002 Nm, and the cogging torque was 0.0122 Nm. In this way, the cogging torque attributed to the stator yoke can be reduced.

However, even with such a method, the duodenary, twenty-fourth order, and thirty-sixth order components, which are attributed to the permanent magnets, cannot be eliminated. In particular, when the permanent magnet motor is used for electric power steering motors, lower order components greatly affect the steering feel, so that it is desirable to reduce the duodenary component.

In order to eliminate an order component (duodenary component, in the comparative example) of the cogging torque caused by the permanent magnets, a method has been used in which each of the permanent magnets of the rotor are divided into a plurality of magnets in the axial direction and are skewed. In this case, the skew angle is 360°/the number of salient poles (30°, in the comparative example). However, in the case of the permanent magnet motor in which a reduced cogging torque is achieved by using any of the combinations of the number of poles and the number of salient poles shown in Table 1, the difference between the number of poles and the number of salient poles is small, so that when skewing is performed, different magnetic poles come to be opposed to one salient pole at the same time, and thus driving torque is not generated. Accordingly, there has been no effective measure for reducing such cogging torque caused by permanent magnets, and there has been a problem in that there are practical limitations to industrial processes for reducing the cogging torque by suppressing variations in the permanent magnets.

SUMMARY OF THE INVENTION

It is an object of the present invention to reduce the cogging torque of servomotors, electric power steering motors, and others, and to provide a permanent magnet motor with which it is possible to realize a robot in which a servomotor that is capable of positioning with high accuracy is used and an electric power steering that generates low vibrations and provides good steering feel by eliminating a component of the togging torque caused by permanent magnets.

According to one aspect of the present invention, there is provided a permanent magnet motor comprising:

a rotor comprising a rotor yoke and a plurality of permanent magnets that are disposed on a side face of the rotor yoke at predetermined intervals such that polarities of the permanent magnets alternate in a circumferential direction of the rotor yoke; and a stator comprising a stator yoke that is disposed at a distance from the rotor, salient magnetic poles that are disposed on the stator yoke at even intervals with respect to a circumferential direction and that are opposed to the permanent magnets, and three-phase connected armature windings that are concentratedly wound around the respective salient magnetic poles, wherein at least one of the permanent magnets is disposed in an adjustment position that is displaced from a corresponding reference position in at least one of the circumferential, radial, and axial directions of the rotor yoke, wherein the reference positions are located at even intervals with respect to the circumferential direction of the rotor yoke, are equidistant from the central axis with respect to the radial direction, and are equidistant from axial direction ends of the rotor yoke with respect to the axial direction, and the plurality of permanent magnets excluding the permanent magnet disposed in the adjustment position is disposed in the reference positions, and wherein the adjustment position is set so that the permanent magnet motor in which at least one of the plurality of permanent magnets is disposed in the adjustment position has a smaller cogging torque than a permanent magnet motor in which all of the plurality of permanent magnets are disposed in the reference positions.

According to another aspect of the present invention, there is provided a method for adjusting a cogging torque of a permanent magnet motor, the permanent magnet motor comprising:

a rotor comprising a rotor yoke and a plurality of permanent magnet that are disposed on a side face of the rotor yoke at predetermined intervals such that polarities of the permanent magnets alternate in a circumferential direction of the rotor yoke; and a stator comprising a stator yoke that is disposed at a distance from the rotor, salient magnetic poles that are disposed on the stator yoke at even intervals with respect to the circumferential direction and that are opposed to the permanent magnets, and three-phase connected armature windings that are concentratedly wound around the respective salient magnetic poles, wherein the method comprises steps of:

disposing the plurality of permanent magnets in reference positions that are located at even intervals with respect to the circumferential direction of the rotor yoke, are equidistant from the central axis with respect to a radial direction, and are equidistant from axial direction ends of the rotor yoke with respect to an axial direction, such that the polarities of the permanent magnets alternate in the circumferential direction; and moving at least one of the permanent magnets in at least one of the circumferential, radial, and axial directions of the rotor yoke to adjust the cogging torque.

As will be described in detail below, according to the present invention, it is possible to reduce the cogging torque caused by variations in the permanent magnets, and to realize a robot in which a servomotor that is capable of positioning with high accuracy is used and an electric power steering motor that generates low vibrations and provides good steering feel.

DETAILED DESCRIPTION OF PREFERRED EMBODIMENTS

Figure 1:
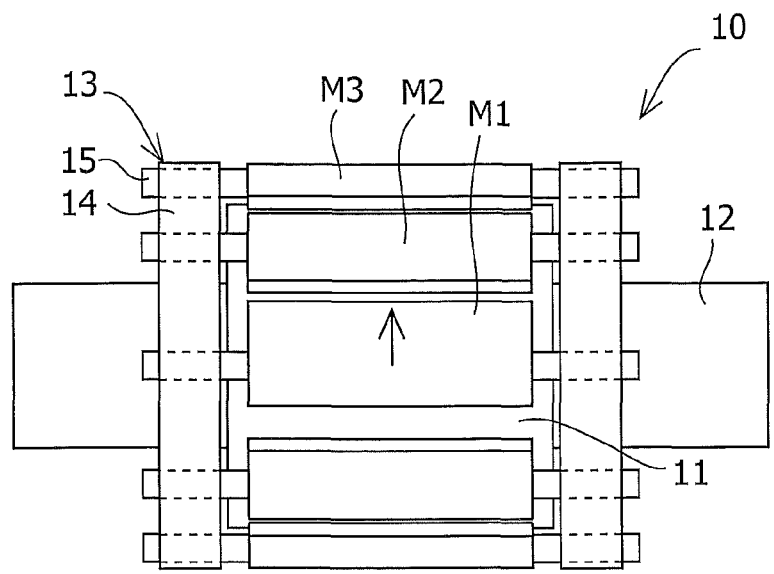
FIG. 1 shows a schematic front view of a rotor when viewed from a direction perpendicular to the axis of the rotor, according to the first embodiment.

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

As in the foregoing description, according to the present invention, there is provided a permanent magnet motor comprising:

a rotor comprising a rotor yoke and a plurality of permanent magnets that are disposed on a side face of the rotor yoke at predetermined intervals such that polarities of the permanent magnets alternate in a circumferential direction of the rotor yoke; and a stator comprising a stator yoke that is disposed at a distance from the rotor, salient magnetic poles that are disposed on the stator yoke at even intervals with respect to a circumferential direction and that are opposed to the permanent magnets, and three-phase connected armature windings that are concentratedly wound around the respective salient magnetic poles, wherein at least one of the permanent magnets is disposed in an adjustment position that is displaced from a corresponding reference position in at least one of the circumferential, radial, and axial directions of the rotor yoke, wherein the reference positions are located at even intervals with respect to the circumferential direction of the rotor yoke, are equidistant from the central axis with respect to the radial direction, and are equidistant from axial direction ends of the rotor yoke with respect to the axial direction, and the plurality of permanent magnets excluding the permanent magnet disposed in the adjustment position is disposed in the reference positions, and wherein the adjustment position is set so that the permanent magnet motor in which at least one of the plurality of permanent magnets is disposed in the adjustment position has a smaller cogging torque than a permanent magnet motor in which all of the plurality of permanent magnets are disposed in the reference positions.

In the present invention, the permanent magnet motor can have the same configuration as conventional permanent magnet motors, except for items particularly described below, such as the position of the permanent magnets, magnet holding member, and others, so that a detailed description thereof is omitted. For the permanent magnets, in addition to a neodymium magnet, a samarium cobalt magnet, a ferrite magnet, and a bonded magnet of these magnets may be used, and there is no particular limitation regarding the material of the permanent magnets. Moreover, a low carbon steel or a silicon steel can be used for the rotor yoke. The rotor yoke can be a cylinder having a circular aperture in its center. A shaft having the same diameter as the aperture is made to penetrate the aperture of the rotor yoke. A low carbon steel can be used for the shaft.

First, a plurality of permanent magnets is disposed in the reference positions on the rotor yoke so that the polarities of the permanent magnets alternate in the circumferential direction. Here, "reference positions" are located at even intervals with respect to the circumferential direction of the rotor yoke, are equidistant from the central axis with respect to the radial direction, and are equidistant from the axial direction ends of the rotor yoke with respect to the axial direction. In other words, "reference positions" are the positions in which the permanent magnets have been disposed in conventional permanent magnet motors. If there is no variation in the characteristics and the dimensions of the magnets and all factors are in an ideal state, then when the permanent magnets are disposed in the reference positions, cogging torque can be minimized. The permanent magnets can be attached to the rotor yoke by the attraction of the magnets.

Here, preferably, the plurality of permanent magnets is held in the reference positions by magnet holding member. The magnet holding members can hold the permanent magnets, preferably all of the permanent magnets, in the reference positions and in adjustment positions, as will be described below, and the magnet holding member can include magnet holding yokes and magnet holders. The magnet holding yoke can be a ring having an aperture whose diameter is equal to that of the shaft. Furthermore, the magnet holding yoke has the same number of tap holes as the permanent magnets, and the tap holes are disposed at even intervals in the circumferential direction within a concentric circular shape whose radius is equal to the distance of the axis of the rotor and the permanent magnets. The periphery of the magnet holding yoke also can have a polygonal shape. As the magnet holder, for example, a hexagon socket set screw can be used. It is preferable to use a non-magnetic material that does not affect the magnetic field, such as aluminum, stainless steel, and resin materials such as MC nylon, for the magnet holding yokes and the magnet holders. First, the magnet holding yokes are fixed to the shaft respectively at both sides of the rotor yoke by bolting or adhesion. Then, both ends of each of the permanent magnets that are disposed in the reference positions on the surface of the rotor yoke are pressed down by the magnet holders provided for the magnetic holding yokes, and thus the permanent magnets can be mechanically held.

Next, at least one of the permanent magnets is moved in at least one direction of the circumferential direction, the radial direction, and the axial direction of the rotor yoke, so as to adjust the cogging torque. More specifically, the cogging torque is measured before adjustment of the cogging torque, that is to say, when the permanent magnets are disposed in the reference positions, and then, the cogging torque is measured after one of the permanent magnets is moved in at least one direction of the circumferential direction, the radial direction, and the axial direction of the rotor yoke, and furthermore, the cogging torque can be adjusted by determining based on the obtained measurement values, which permanent magnet is to be moved and the distance that the permanent magnet is to be moved using a linear programming method such that the cogging torque is more reduced. In other words, according to another aspect of the present invention, there is provided a permanent magnet motor in which at least one of permanent magnets is disposed in an adjustment position that is displaced from a corresponding reference position in at least one of circumferential, radial, and axial directions of a rotor yoke, and the plurality of permanent magnets excluding the permanent magnet that is disposed in the adjustment position is disposed in the reference positions. Here, the adjustment position is set so that the permanent magnet motor in which at least one of the plurality of permanent magnets is disposed in the adjustment position has a smaller cogging torque than a permanent magnet motor in which all of the plurality of permanent magnets are disposed in the reference positions.

That is to say, as will be described in detail below, according to the present invention, by moving a permanent magnet on the rotor yoke, an order (duodenary, in the comparative example described above) component of the cogging torque caused by the permanent magnets can be significantly reduced.

When a permanent magnet on the rotor yoke is moved, the cogging torque is changed. Here, as shown below, the components of the cogging torque that changed are of the same orders (orders of multiples of 12, in the comparative example) as the orders of the cogging torque caused by the permanent magnets, and most of these components are of the smallest order (duodenary, in the comparative example) of the relevant orders. Furthermore, the amount of change in the cogging torque is proportional to the amount of movement. Moreover, the phase of the waveform of the amount of change in the cogging torque is changed by changing the position ($\theta$) of the magnet to be moved. By moving the permanent magnet, the component (duodenary component, in the comparative example) of the cogging torque caused by the permanent magnets is changed, and the phase thereof changes depending of the position of the magnet moved. This implies that the cogging torque can be reduced by adjusting the position of the magnet to be moved and the amount of movement of the permanent magnet such that the waveform of the cogging torque caused by the permanent magnets is canceled.

Accordingly, an analysis was carried out using a mathematical programming method to determine which magnet should be moved and how far that magnet should be moved in order to reduce the cogging torque. Here, since the amount of change in the cogging torque is proportional to the amount of movement, as described above, it is preferable to use a linear programming method as the mathematical programming method. When adjustment of the cogging torque is expressed as a linear programming problem, it can be expressed as "minimizing (1) under a condition (2)", and by solving this problem, the position of the magnet to be moved and the amount of movement of the permanent magnet can be determined. It should be noted that, the position of the magnet is used to specify each of the plurality of permanent magnets disposed on the rotor yoke, and for example, in the comparative example described above, there are ten positions of the magnets, each of which represents the corresponding permanent magnet.

$$Z = C_0 \sum_{j=1}^{B} X_j + C_1 W \qquad (1)$$

$$\left.\begin{array}{l} \sum_{j=1}^{B} a_{ij} X_j + \dfrac{W}{2} \geq -T_i - \dfrac{1}{2}\text{tole} + T_l \\ -\sum_{j=1}^{B} a_{ij} X_j + \dfrac{W}{2} \geq T_i - \dfrac{1}{2}\text{tole} - T_l \\ X_j, W \geq 0 \end{array}\right\} \qquad (2)$$

In the formulae, the letters represent the following:

B represents the number of magnets.

represents the point at which the cogging torque is measured. That is to say, each value of i represents an angle (0° to 360°) of revolution of the rotor, which is a point at which the cogging torque is measured.

j represents the position of the magnet. That is to say, j takes any integer between 1 and the number B of permanent magnets, and each value of j represents a permanent magnet.

$X_j$ is the amount of movement of the j-th magnet.

$T_i$ is the cogging torque at the i-th point before adjustment of the cogging torque. Measurement data for the cogging torque before adjustment is input as $T_i$.

$a_{ij}$ is the amount of change in the cogging torque at the i-th point per amount of movement of the j-th magnet, when the j-th magnet is moved. More specifically, with respect to each i-th point, $a_{ij}$ can be obtained by dividing the measurement value for the amount of change in the cogging torque that is measured when the j-th magnet is moved by the amount of movement of the magnet.

$T_l$ is the loss torque before adjustment of the cogging torque. $T_l$ can be an average value of the measurement values of the cogging torque before adjustment.

tole is a target cogging torque. tole can be set as desired according to the application of the permanent magnet motor. In particular, when the permanent magnet motor is applied to servomotors, electric power steering motors, and others, it is preferable that tole is set to no greater than 0.5% of the rated torque.

W is the difference between the target cogging torque (tole) and a calculated value of the cogging torque after the permanent magnet has been moved. More specifically, W is expressed by Formula (3) below:

$$W = \max\left(T_i + \sum_{j=1}^{B} a_{ij} X_j\right) - \min\left(T_i + \sum_{j=1}^{B} a_{ij} X_j\right) - \text{tole} \qquad (3)$$

$C_0$ and $C_1$ are coefficients, which are set according to the balance between the amount of movement of the magnet and the cogging torque. $C_0$ is a number of 0 or more, and $C_1$ is a number more than 0. That is to say, $C_0$ and $C_1$ are determined according to the balance of B, $X_j$, tole, and W. If $C_0$ and $C_1$ are changed, then the solution of the linear program is changed, and thus calculations are performed while adjusting these coefficients. An operator can obtain an optimum amount of movement $X_j$ by performing a plurality of calculations while adjusting the values of $C_0$ and $C_1$ such that the target cogging torque can be achieved with as small a total amount ($\Sigma X_j$) of movement of the magnets as possible. More specifically, although it is not a particular limitation, a calculation is initially performed using $C_0/C_1=0$ to obtain the amount $X_j$ of movement of each magnet. Here, when it is desired to reduce the total amount ($\Sigma X_j$) of movement of the magnets more, a further calculation is performed by increasing $C_0/C_1$, for example, using $C_0/C_1=0.001$, to obtain the amount ($X_j$) of movement of each magnet. By repeating this process, it is possible to achieve the target cogging torque with as small an amount of movement of the magnets as possible.

With the above-described linear programming problem, by inputting into the linear program the data of the cogging torque before adjustment and the data for the amount of change in the cogging torque when each permanent magnet is moved in, for example, the circumferential direction, the amount of movement of each permanent magnet can be calculated such that the cogging torque is reduced.

When the position of the magnet to be moved and the amount of movement of the permanent magnet are determined by the mathematical programming method, the permanent magnet is moved in accordance with that result. At this time, the permanent magnet can be moved using a dedicated jig, as when the permanent magnet was disposed in the reference position. Moreover, it is preferable that the permanent magnet is moved with the same precision as when the permanent magnet was disposed in the reference position. Moreover, after the permanent magnet is moved, it is preferable that the plurality of permanent magnets is held in the adjustment positions by the magnet holding member.

Referring to FIG. 1, a first embodiment according to the present invention will be described. FIG. 1 shows a schematic front view of a rotor when viewed from a direction perpendicular to the axis of the rotor, according to the first embodiment. As described above, the rotor 10 according to the first embodiment has a configuration in which at the first time a permanent magnet motor has a plurality of permanent magnets (M1 to M10) disposed in reference positions on a rotor yoke 11 through which a shaft 12 passes, wherein the plurality of permanent magnets are held in the reference positions from both sides of the rotor yoke 11 by magnet holding member 13, including magnet holding yokes 14 and magnet holders 15, subsequently, one (M1) of the permanent magnets is moved in the circumferential direction of the rotor yoke to adjust cogging torque, and furthermore the permanent magnets are held in respective adjustment positions by the magnet holding member. In the drawing, the direction in which the magnet is moved is indicated by an arrow.

Figure 2:
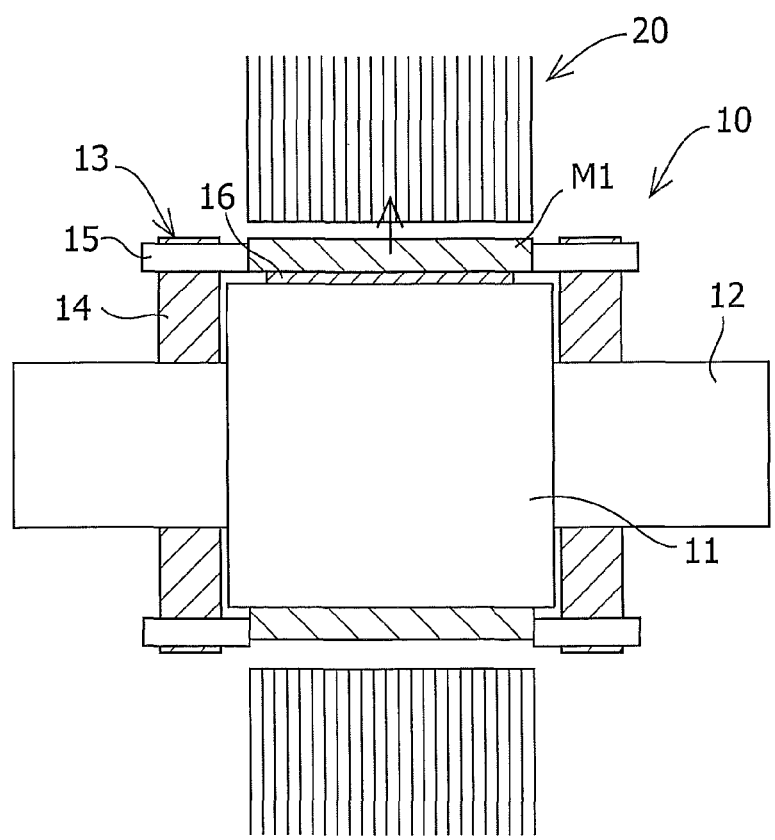
FIG. 2 shows a schematic cross-sectional view of a permanent magnet motor in a plane passing through the axis of the rotor, according to the second embodiment.

Referring to FIG. 2, a second embodiment according to the present invention will be described. FIG. 2 shows a schematic cross-sectional view of a permanent magnet motor in a plane passing through the axis of the rotor, according to the second embodiment. It should be noted that, in addition to the rotor, a stator 20 having salient poles that are disposed to be opposed to the magnets also is shown in FIG. 2. In the permanent magnet motor according to the second embodiment, in contrast to the first embodiment, one (M1) of the permanent magnets is moved in the radial direction of the rotor yoke to adjust the cogging torque. When moving the permanent magnet in the radial direction, it is preferable to move the permanent magnet in the radial direction by inserting a nonmagnetic shim 16 having a calculated thickness between the permanent magnet (M1) and the rotor yoke 11 and then hold the permanent magnet with the magnet holding member 13. In the drawing, the direction in which the magnet is moved is indicated by an arrow.

Figure 3:
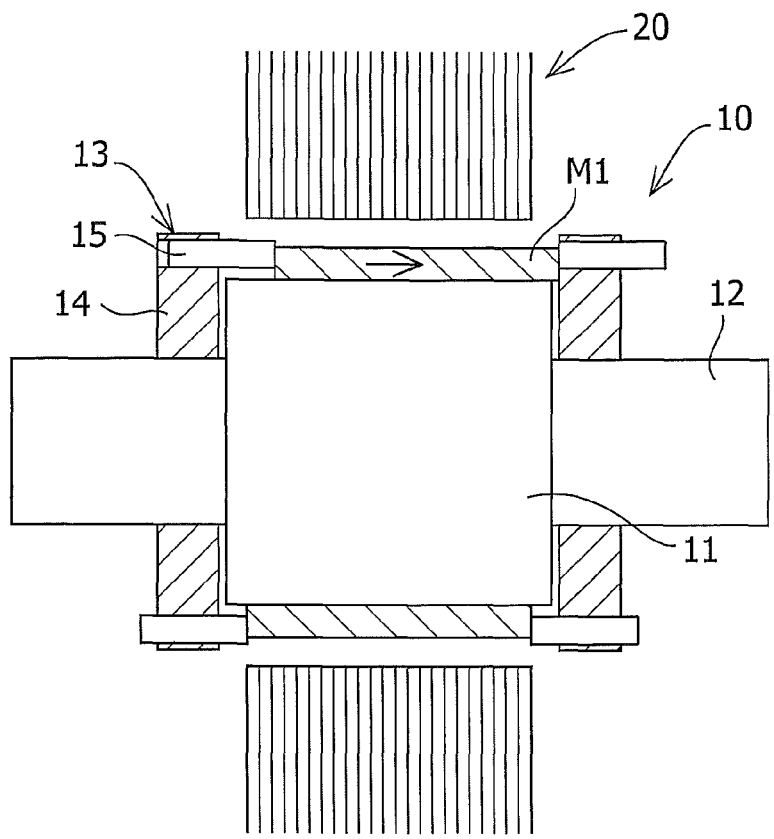
FIG. 3 shows a schematic cross-sectional view of a permanent magnet motor in a plane passing through the axis of the rotor, according to the third embodiment.

Referring to FIG. 3, a third embodiment of the present invention is described. FIG. 3 shows a schematic cross-sectional view of a permanent magnet motor in a plane passing through the axis of the rotor, according to the third embodiment. It should be noted that, in addition to the rotor, a stator yoke having salient poles that are disposed to be opposed to magnets also is shown in FIG. 3. In the permanent magnet motor according to the third embodiment, in contrast to the first embodiment, one (M1) of the permanent magnets is moved in the axial direction of the rotor yoke 11 to adjust the cogging torque. In the drawing, the direction in which the magnet is moved is indicated by an arrow.

Regarding the moving direction, a direction in which the smallest number of magnets is to be moved is chosen based on the results of calculations using the mathematical programming method. In the first to third embodiments, the permanent magnet is moved only in the circumferential direction, the radial direction, or the axial direction to adjust the cogging torque. However, it is also possible to combine these directions to adjust the cogging torque. Which direction of the circumferential direction, the radial direction, the axial direction, and a combination of these directions is chosen as the moving direction can be determined in the following manner. That is to say, when the amount of movement is obtained for each direction using the mathematical programming method and a direction of adjustment in which a small number of magnets are to be adjusted is used as the moving direction, then an adjustment can be made with less error. When the value of the cogging torque after an adjustment does not satisfy the target, a readjustment can be made to the state after the adjustment, using the same method. The direction of the readjustment may be a direction different from the direction of the previous adjustment, and the moving direction is not limited to only either one of these directions.

Regarding the upper limit of the amount of movement of a permanent magnet, when the permanent magnet is moved in the circumferential direction, the permanent magnet can be moved until it touches an adjacent permanent magnet. When the permanent magnet is moved in the radial direction, it is preferable that the permanent magnet can be moved until an air gap between the inner surface of the stator and the permanent magnet reaches a minimum of 0.1 mm, since if the stator and the permanent magnet come into contact with each other, the rotor will no longer rotate. When the permanent magnet is moved in the axial direction, the permanent magnet can be moved until it touches the holding mechanism.

Figure 4:
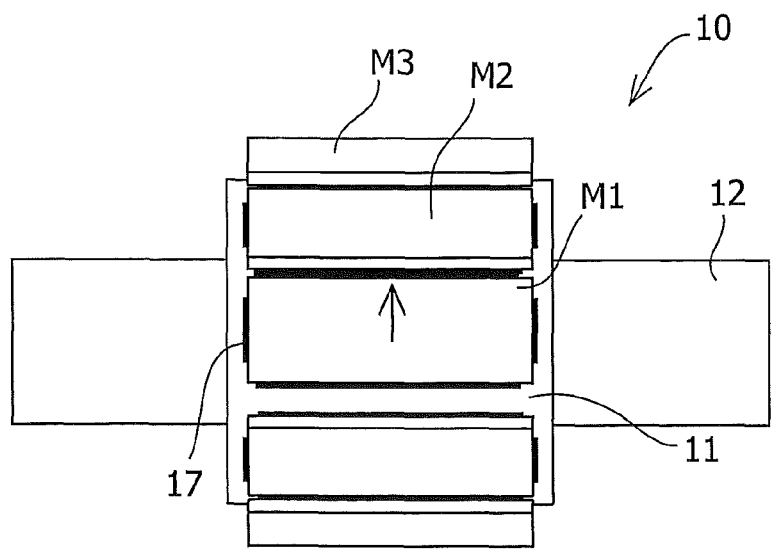
FIG. 4 shows a schematic front view of a rotor when viewed from a direction perpendicular to the axis of the rotor, according to a fourth embodiment.

Moreover, it is possible to fix the above-described plurality of permanent magnets in the adjustment positions with an adhesive. In this case, it is possible to remove the magnet holding member after fixing the permanent magnets. FIG. 4 shows a schematic front view of a rotor when viewed from a direction perpendicular to the axis of the rotor, according to a fourth embodiment. As shown in FIG. 4, if after a permanent magnet is moved, an adhesive 17 is applied around each of the magnets and the permanent magnets are fixed, then the magnet holding system may be removed. In this case, the magnet holding system can be used to adjust the togging torque of another permanent magnet motor.

It is preferable that the stator yoke is made by the rotational laminating method in order to eliminate the magnetic anisotropy of the stator yoke. Moreover, it is preferable that the number P of poles of the rotor and the number M of salient stator poles satisfy Expression 1 or Expression 2 below. More specifically, it is preferable to use any of the combinations of the number P of poles and the number M of salient stator poles shown in Table 1 above. The reason for this is that by using a permanent magnet motor having a relationship between the number P of poles of the rotor and the number M of salient stator poles that satisfies Expression 1 or Expression 2, the cogging torque can be reduced. Moreover, the present invention provides the same effect even for a permanent magnet motor that satisfies Expression 3 below, which expresses the relationship in an ordinary concentrated winding motor.

$$P=6n\pm2, M=6n \qquad \text{Expression 1}$$

wherein n is an integer of 2 or more, $$P=3m\pm1, M=3m \qquad \text{Expression 2}$$

wherein m is an odd number of 3 or more, and $$P=2k, M=3k \qquad \text{Expression 3}$$

wherein k is an integer of 1 or more.

EXAMPLES

Working examples of the present invention will be described below with reference to the attached drawings. The working examples described below do not limit the present invention.

Figure 14:
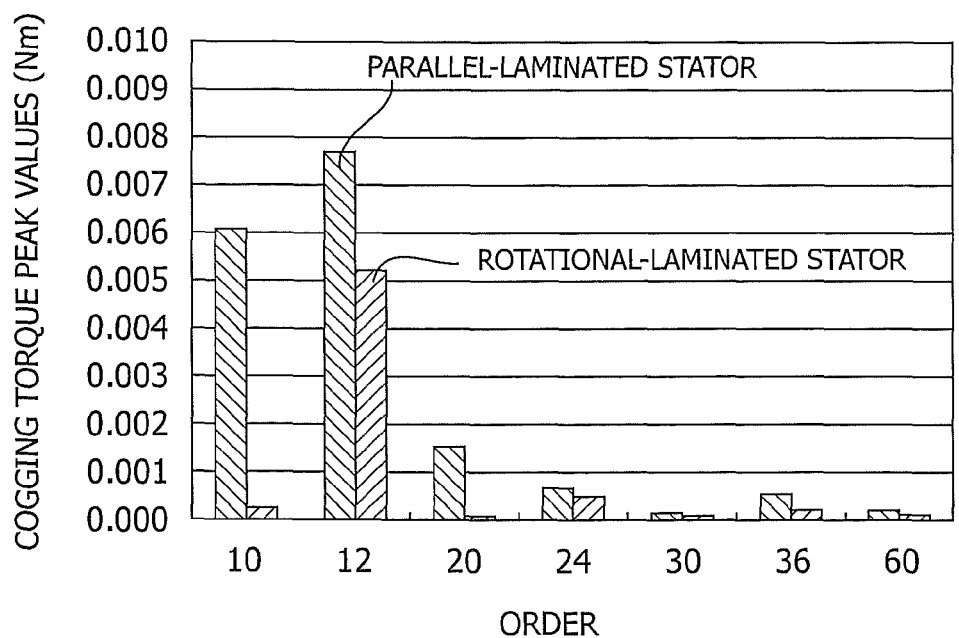
FIG. 14 shows the results of a Fourier analysis in which the cogging torque waveform according to Comparative Example 1 was divided into components of respective orders of the waveform.
Figure 15:
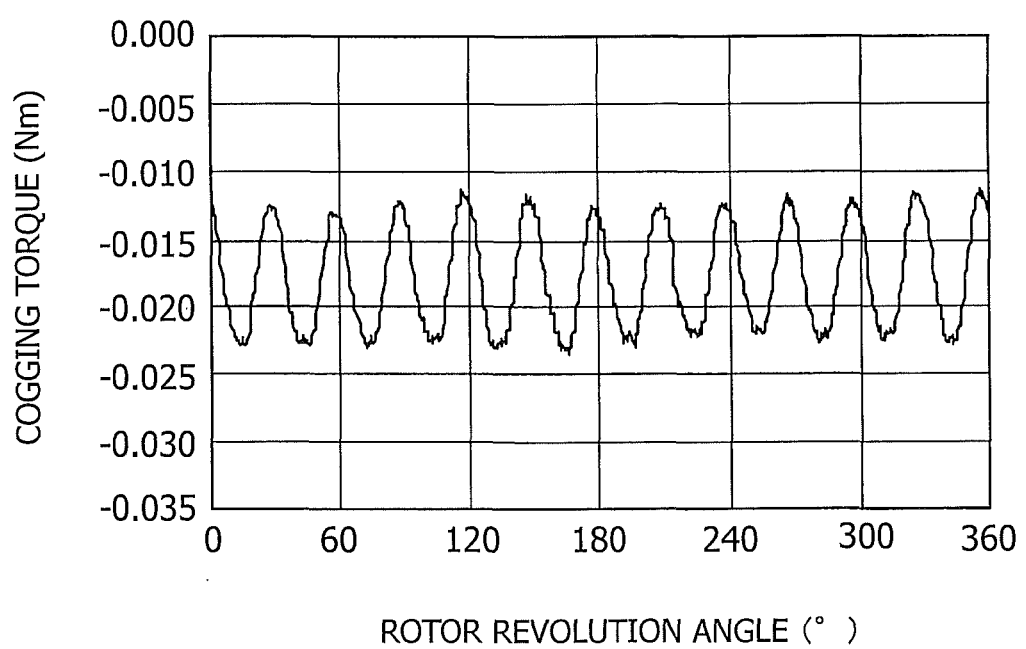
FIG. 15 shows an actually-measured waveform of the cogging torque of the permanent magnet motor according to Comparative Example 2 (rotational-laminated stator).

As shown in Comparative Example 2, by performing the rotational laminating method, the influence of the stator yoke can be eliminated (see FIGS. 14 and 15), and in Comparative Example 2, the cogging torque was 0.0122 Nm. However, as described above, it is desirable that the cogging torque is no greater than 0.5% of the rated torque (no greater than 0.01 Nm in the present case), and this was not achieved in Comparative Example 2. Thus, in the working examples below, an adjustment of the cogging torque was carried out for the permanent magnet motor shown in Comparative Example 2.

Working Example 1

Figure 11:
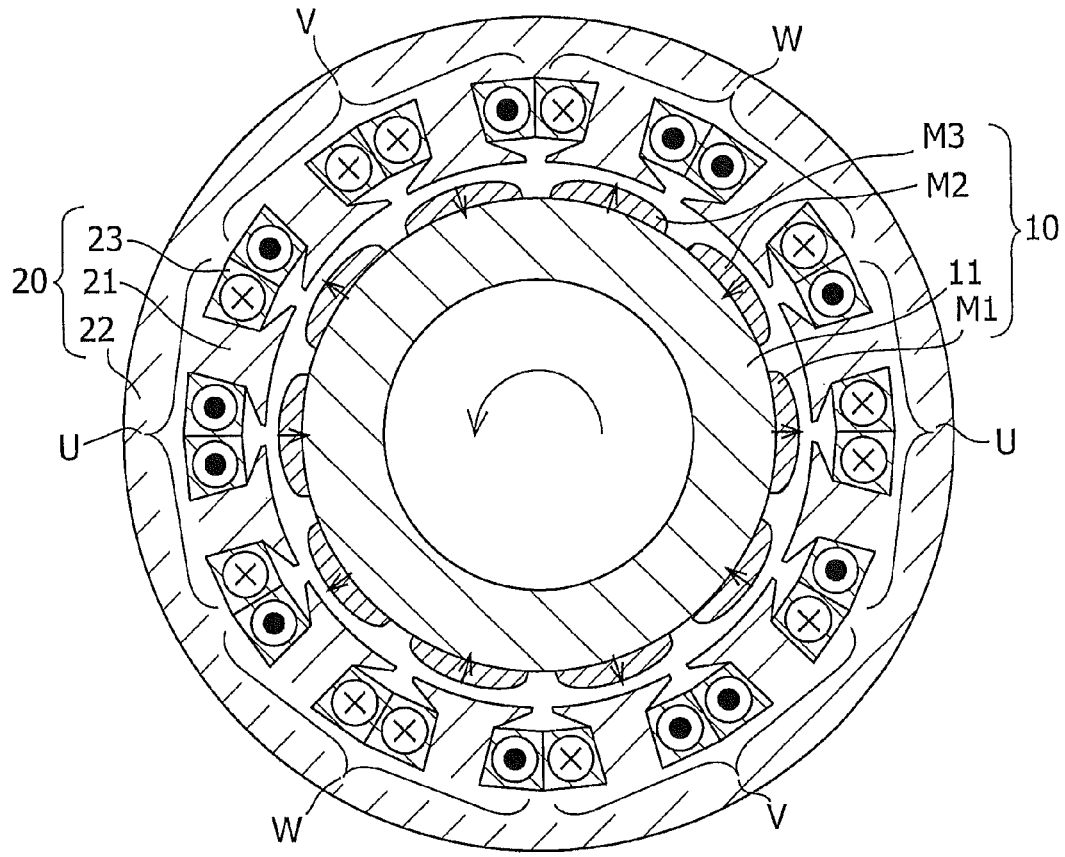
FIG. 11 shows a schematic cross-sectional view of the permanent magnet motor having 10 poles and 12 slots, in a plane perpendicular to the axis of the permanent magnet motor, according to the working and comparative examples.
Figure 12:
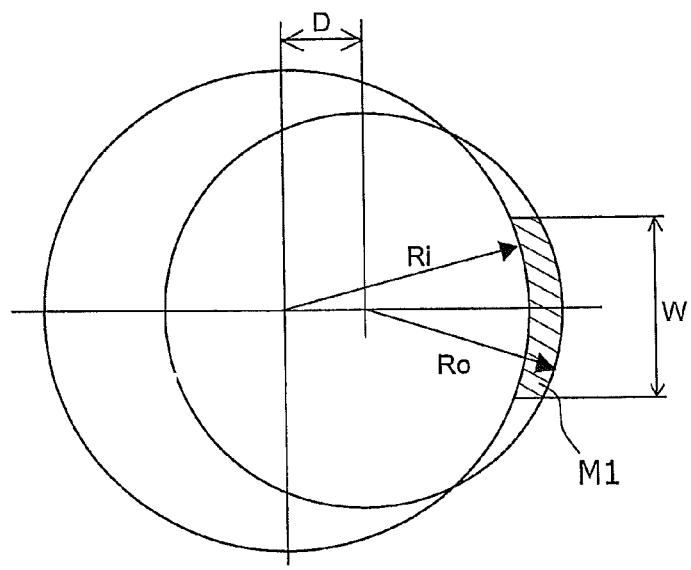
FIG. 12 shows a specific shape of the permanent magnets according to the working and comparative examples.
Figure 13:
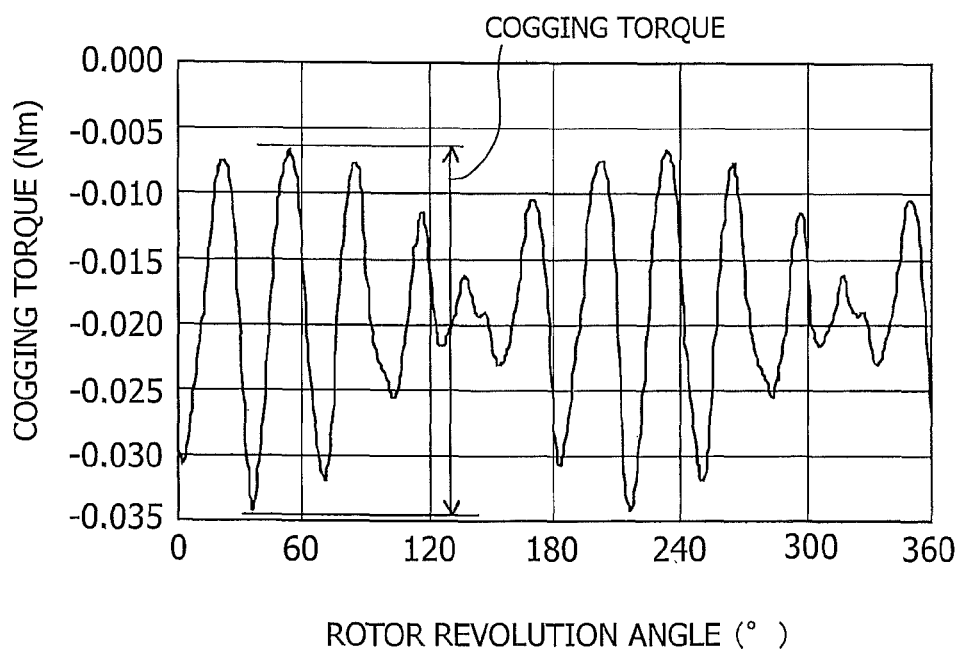
FIG. 13 shows an actually-measured waveform of the cogging torque of the permanent magnet motor according to Comparative Example 1 (parallel-laminated stator).

A permanent magnet motor according to Working Example 1 had the same configuration as the permanent magnet motor according to Comparative Example 2 described above, except for items particularly described below, such as the position of the permanent magnets and the magnet holding member (see FIG. 11). It should be noted that a shaft runs through the center of the rotor yoke made of a low carbon steel, the shaft being made of the same material. In Working Example 1, the permanent magnets were held by the magnet holding member after a permanent magnet was moved in the circumferential direction, as shown in FIG. 1. Here, as the magnet holding member, magnet holding yokes having tap holes and hexagon socket set screws serving as the magnet holders were used. Moreover, the stator yoke was made by the rotational laminating method.

Figure 5:
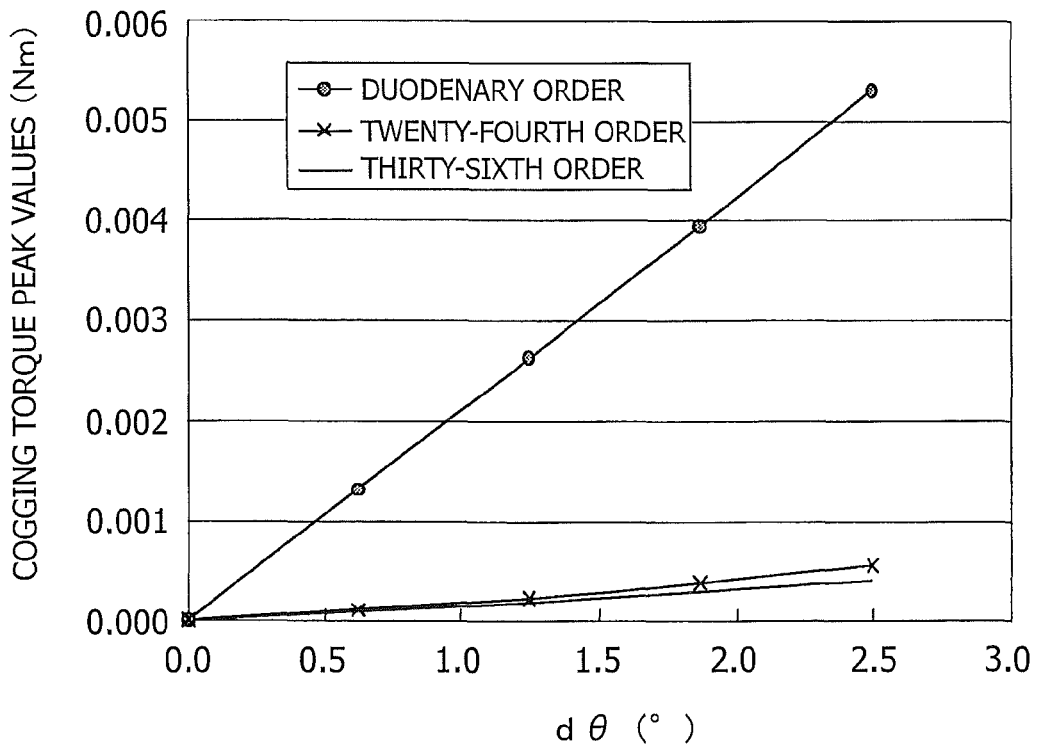
FIG. 5 shows the results of the Fourier analysis in which the waveform of the amount of the change in the cogging torque when the permanent magnet was moved in the circumferential direction was divided into components of respective orders of the waveform.
Figure 6:
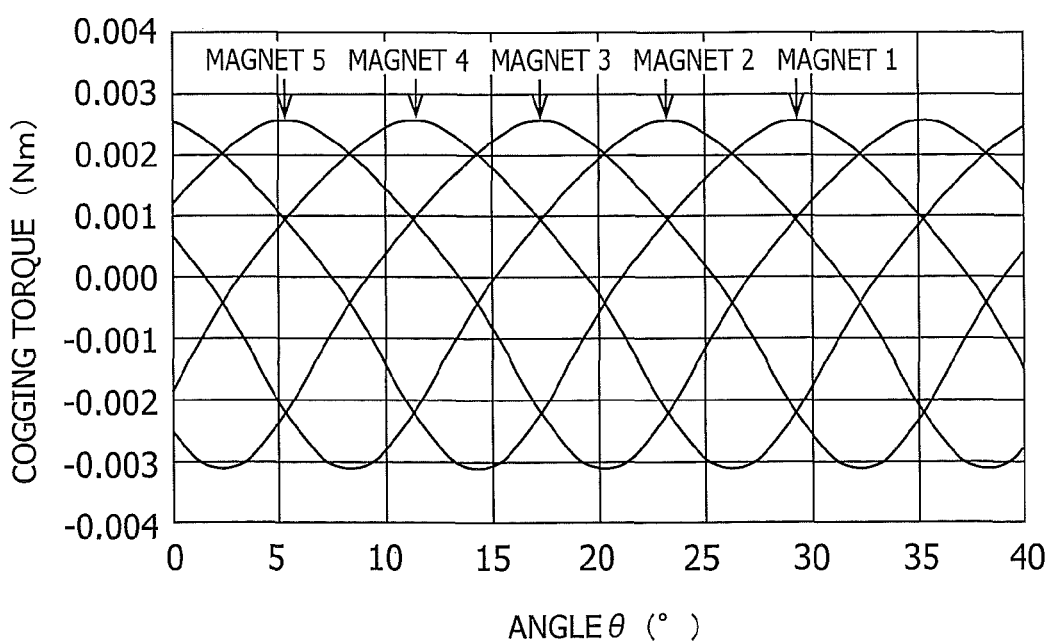
FIG. 6 shows the actually-measured waveforms of the amount of change in the cogging torque when the permanent magnets in different magnet positions were moved in the radial direction.

First, the amount of change in the cogging torque was measured when the permanent magnet was moved in the circumferential direction. More specifically, the amount of a change in the cogging torque that occurred when the magnet M1 in FIG. 11 was moved in the circumferential direction was measured, and components of the change in the cogging torque were analyzed using Fourier analysis as in the above-described comparative example. FIG. 5 shows the results of the Fourier analysis in which the waveform of the amount of the change in the cogging torque when the permanent magnet was moved in the circumferential direction was divided into components of respective orders of the waveform. Moreover, the waveform of the amount of change in the cogging torque was measured each time when the magnet M1, M2, M3, M4, or M5 in FIG. 11 was moved individually in the same direction by 1.25°. FIG. 6 shows the actually-measured waveforms of the amount of change in the cogging torque when the permanent magnets in different magnet positions were moved in the radial direction.

As shown in FIG. 5, the components of the cogging torque that changed were of orders of multiples of 12, most of which were duodenary, and the amount of change was proportional to the amount of movement. Moreover, as shown in FIG. 6, the phase of the waveform was changed by changing the position (θ) of the magnet. Thus, it was implied that the cogging torque can be reduced by adjusting the position of a magnet to be moved, and adjusting the amount of movement of the permanent magnet such that the waveform of the cogging torque caused by the permanent magnets is canceled.

In Working Example 1, in order to adjust the cogging torque, the position of the magnet to be moved and the amount of movement of the permanent magnet were determined by solving the above-described linear programming problem "minimizing (1) under the condition (2)". More specifically, in Working Example 1, the cogging torque was adjusted by moving the permanent magnet in the circumferential direction. First, data for the cogging torque before adjustment and data for the amount of change in the cogging torque when each permanent magnet was moved in the circumferential direction were input into the linear program, and the amount of movement of each permanent magnet was calculated so as to reduce the cogging torque. More specifically, calculations were performed by inputting the following data with respect to each of the letters in Formulae (1) and (2).

In Formula (1), B=10, $C_0$=0, 0.0001, 0.001, 0.01, and $C_1$=1. In Formula (2), i=1 to 600, tole=0.001, $T_i$=the waveform of the torque shown in FIG. 15 at the measurement point i ($T_1$=−0.01268, $T_2$=−0.01285, $T_3$=−0.01346, ...), and $a_{ij}$=the waveform of the amount of change in the cogging torque shown in FIG. 6 divided by an amount of movement of 1.25° ($a_{11}$=0.00203, $a_{21}$=0.00195, $a_{31}$=0.00184, $a_{12}$=0.00043, $a_{22}$=0.00023, ...).

Table 2 shows the amount of movement ($X_i$) of the magnets and the cogging torque at each value of $C_0/C_1$.

TABLE 2

| | | Coefficients $C_0/C_1$ | | | |
|---|---|---|---|---|---|
| | | 0.01 | 0.001 | 0.0001 | 0 |
| Amount of Adjustment (°) | $X_1$ | 0 | 0 | 0 | 0.3 |
| | $X_2$ | 0 | 0 | 0.3 | 0.7 |
| | $X_3$ | 0 | 1 | 0.5 | 0.3 |
| | $X_4$ | 0 | 2.2 | 2.8 | 3.2 |
| | $X_5$ | 0 | 0 | 0 | 0 |
| | $X_6$ | 0 | 0 | 0 | 0 |
| | $X_7$ | 0 | 0 | 0 | 0 |
| | $X_8$ | 0 | 0 | 0 | 0 |
| | $X_9$ | 0 | 0 | 0 | 0 |
| | $X_{10}$ | 0 | 0 | 0 | 0 |
| Cogging torque before adjustment (Nm) | | 0.0122 | 0.0122 | 0.0122 | 0.0122 |
| Cogging torque after adjustment (Nm) | | 0.0122 | 0.0036 | 0.0036 | 0.0036 |

Figure 7:
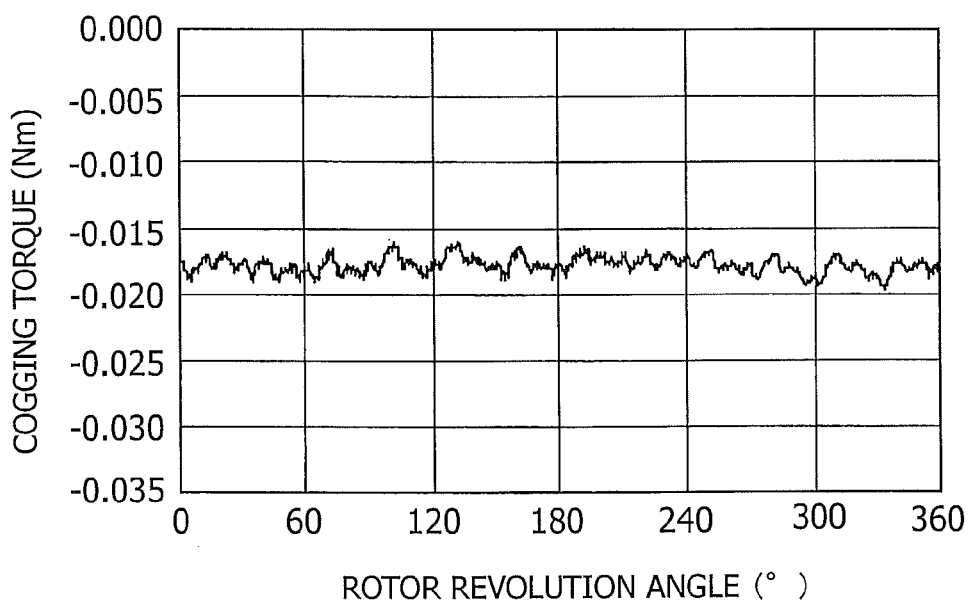
FIG. 7 shows the actually-measured waveform of the cogging torque of the permanent magnet motor according to Working Example 1.
Figure 8:
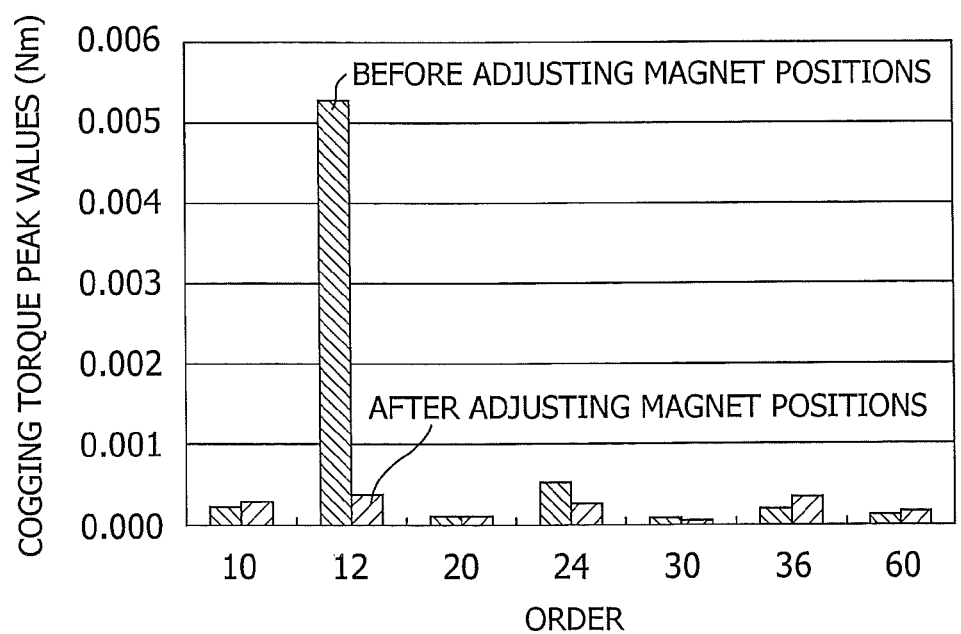
FIG. 8 shows the results of the Fourier analysis in which the waveform of the cogging torque according to Comparative Example 2 and Working Example 1 was divided into components of respective orders of the waveform.

From the calculation results, it was found that the cogging torque can be optimized by moving the magnet M3 by 1.0° and the magnet M4 by 2.2° in the same circumferential direction. According to the calculation results, the permanent magnets were moved, and as in the comparative example, the waveform of the cogging torque was measured and the components of the cogging torque that changed were analyzed using Fourier analysis. FIG. 7 shows the actually-measured waveform of the cogging torque of the permanent magnet motor according to Working Example 1. FIG. 8 shows the results of the Fourier analysis in which the waveform of the cogging torque according to Comparative Example 2 and Working Example 1 was divided into components of respective orders of the waveform. As shown in FIG. 8, the duodenary component (peak value) was 0.0053 Nm in Comparative Example 2, whereas it was significantly reduced to 0.0004 Nm in Working Example 1. Moreover, as shown in FIG. 7, the cogging torque was 0.0122 Nm overall in Comparative Example 2, whereas it became 0.0036 Nm in Working Example 1. In this way, the target cogging torque of no greater than 0.01 Nm (no greater than 0.5% of the rated torque) could be achieved in Working Example 1.

Working Example 2

Figure 9:
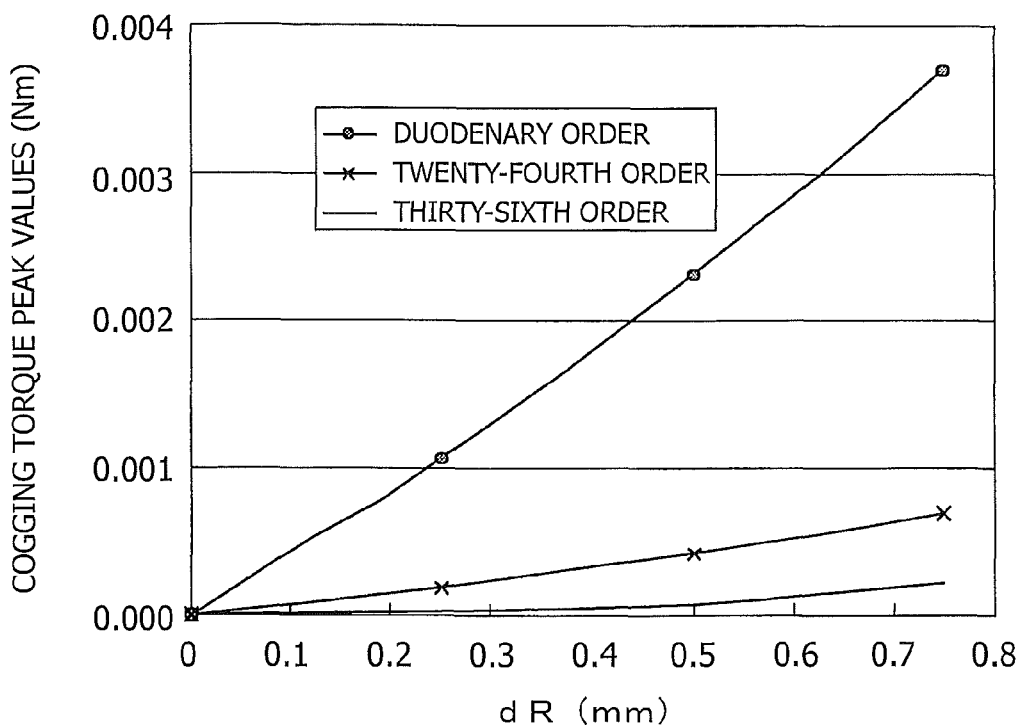
FIG. 9 shows the results of the Fourier analysis in which the waveform of the amount of change in the cogging torque when the permanent magnet was moved in the radial direction was divided into components of respective orders of the waveform.

Working Example 2 was the same as Working Example 1 except that the permanent magnet was moved in the radial direction as shown in FIG. 2. First, the amount of change in the cogging torque when the permanent magnet was moved in the radial direction was measured. Non-magnetic SUS was used for the non-magnetic shim. More specifically, the amount of change in the cogging torque that occurred when the magnet M1 in FIG. 11 was moved in the radial direction was measured, and as in the above-described comparative example, the components of the cogging torque that changed were analyzed using Fourier analysis. FIG. 9 shows the results of the Fourier analysis in which the waveform of the amount of change in the cogging torque when the permanent magnet was moved in the radial direction was divided into components of respective orders of the waveform. As in the case where the permanent magnet was moved in the circumferential direction, the components of the cogging torque that changed were of orders of multiples of 12, most of which were duodenary. Moreover, the amount of change in the cogging torque was proportional to the amount of movement. From these results, it was implied that even when the permanent magnet is moved in the radial direction, the amount that the permanent magnet is to be moved in the radial direction in order to reduce the cogging torque can be obtained using the linear programming method, as in Working Example 1.

As in Working Example 1, data for the cogging torque before adjustment and data for the amount of change in the cogging torque when each permanent magnet was moved in the radial direction were input into the linear program, and the amount of movement of each permanent magnet was calculated so as to reduce the cogging torque. From the calculation results, it was found that the cogging torque could be optimized by moving the magnets M1 and M6 by 0.52 mm, the magnets M4 and M9 by 0.26 mm, and the magnets M5 and M10 by 0.22 mm in the radial direction. According to the calculation results, the permanent magnets were moved, and as in the comparative example, the waveform of the cogging torque was measured and the components of the cogging torque that changed were analyzed using Fourier analysis. The duodenary component (peak value) was 0.0053 Nm in Comparative Example 2, whereas it was significantly reduced to 0.0018 Nm in Working Example 2. Moreover, the overall cogging torque was 0.0122 Nm in Comparative Example 2, whereas it became 0.0068 Nm in Working Example 2. In this way, the target cogging torque of no greater than 0.01 Nm (no greater than 0.5% of the rated torque) could be achieved in Working Example 2.

Working Example 3

Figure 10:
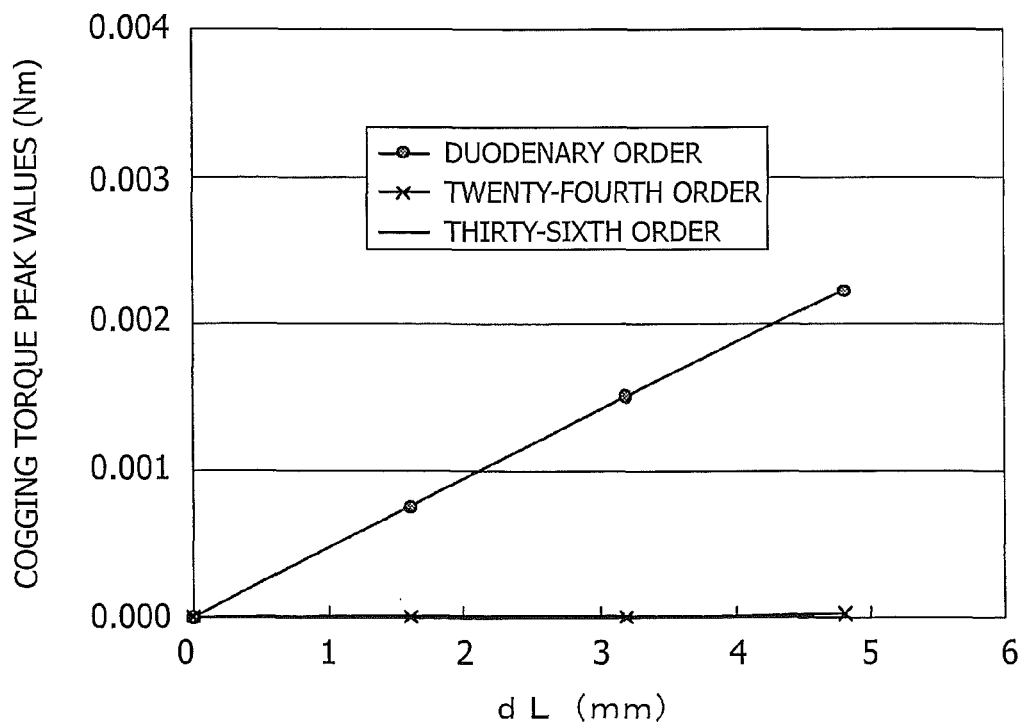
FIG. 10 shows the results of the Fourier analysis in which the waveform of the amount of change in the cogging torque when the permanent magnet was moved in the axial direction was divided into components of respective orders of the waveform.

Working Example 3 was the same as Working Example 1 except that the permanent magnet was moved in the axial direction as shown in FIG. 3. First, the amount of change in the cogging torque when the permanent magnet was moved in the axial direction was measured. More specifically, the amount of change in the cogging torque that occurred when the magnet M1 shown in FIG. 11 was moved in the axial direction was measured, and the components of the cogging torque that changed were analyzed using Fourier analysis. FIG. 10 shows the results of the Fourier analysis in which the waveform of the amount of change in the cogging torque when the permanent magnet was moved in the axial direction was divided into components of respective orders of the waveform. As in the cases where the permanent magnet was moved in the circumferential direction or in the radial direction, almost all of the components of the cogging torque were of duodenary order. Moreover, the amount of change in the cogging torque was proportional to the amount of movement. Accordingly, it was implied that even when the permanent magnet is moved in the axial direction, the amount that the permanent magnet is to be moved in the axial direction in order to reduce the cogging torque could be obtained using the linear programming method, as in Working Examples 1 and 2.

As in Working Example 1, data for the cogging torque before adjustment and data for the amount of change in the cogging torque when each permanent magnet was moved in the axial direction were input into the linear program, and the amount of movement of each permanent magnet was calculated so as to reduce the cogging torque. From the calculation results, it was found that the cogging torque can be optimized by moving the magnet M2 by 2.3 mm and the magnets M3 and M8 by 3.8 mm in the axial direction. According to the calculation results, the permanent magnets were moved, and as in the comparative example, the waveform of the cogging torque was measured and the components of the cogging torque that changed were analyzed using Fourier analysis. The duodenary order component (peak value) was 0.0053 Nm in Comparative Example 2, whereas it was significantly reduced to 0.0017 Nm in Working Example 3. Moreover, the overall cogging torque was 0.0122 Nm in Comparative Example 2, whereas it became 0.0064 Nm in Working Example 3. In this way, the target cogging torque of no greater than 0.01 Nm (no greater than 0.5% of the rated torque) could be achieved in Working Example 3.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

The invention claimed is:

1. A method for adjusting a cogging torque of a permanent magnet motor, the permanent magnet motor comprising:
    a rotor comprising a rotor yoke and a plurality of permanent magnet that are disposed on a side face of the rotor yoke at predetermined intervals such that polarities of the permanent magnets alternate in a circumferential direction of the rotor yoke; and
    a stator comprising a stator yoke that is disposed at a distance from the rotor, salient magnetic poles that are disposed on the stator yoke at even intervals with respect to the circumferential direction and that are opposed to the permanent magnets, and three-phase connected armature windings that are concentratedly wound around the respective salient magnetic poles,
    wherein the method comprises steps of:
    disposing the plurality of permanent magnets in reference positions that are located at even intervals with respect to the circumferential direction of the rotor yoke, are equidistant from the central axis with respect to a radial direction, and are equidistant from axial direction ends of the rotor yoke with respect to an axial direction, such that the polarities of the permanent magnets alternate in the circumferential direction; and
    moving at least one of the permanent magnets in at least one of the circumferential, radial, and axial directions of the rotor yoke to adjust the cogging torque.

2. The method according to claim 1, wherein the step of adjusting the cogging torque comprises:
    measuring the cogging torque before adjusting the cogging torque;
    measuring the cogging torque when one of the permanent magnets is moved in at least one of the circumferential, radial, and axial directions of the rotor yoke; and
    determining a permanent magnet to be moved and an amount that the permanent magnet is to be moved based on obtained measurement values, using a linear programming method, such that the cogging torque can be more reduced.

3. The method according to claim 2, further comprising:
    holding the plurality of permanent magnets in the reference positions by magnet holding members; and/or
    holding the plurality of permanent magnets in adjustment positions to which the permanent magnets have been moved, by magnet holding members.

4. The method according to claim 3, further comprising:
fixing the plurality of permanent magnets in the respective adjustment positions by an adhesive; and
removing the magnet holding member after fixing the permanent magnets.

5. The method according to claim 1, wherein the linear programming method minimizes (1) under a condition (2):

$$Z = C_0 \sum_{j=1}^{B} X_j + C_1 W \quad (1)$$

$$\left. \begin{array}{l} \sum_{j=1}^{B} a_{ij} X_j + \dfrac{W}{2} \geq -T_i - \dfrac{1}{2}\text{tole} + T_l \\ -\sum_{j=1}^{B} a_{ij} X_j + \dfrac{W}{2} \geq T_i - \dfrac{1}{2}\text{tole} - T_l \\ X_j, W \geq 0 \end{array} \right\} \quad (2)$$

wherein
B represents a number of magnets,
i represents a point at which the cogging torque is measured,
j represents a position of the magnet,
$X_j$ is an amount of movement of a j-th magnet,
$T_i$ is the cogging torque at an i-th point before adjusting the cogging torque,
$a_{ij}$ is an amount of change in the cogging torque at the i-th point per amount of movement of the j-th magnet when the j-th magnet is moved,
$T_1$ is a loss torque before adjusting the cogging torque,
tole is a target cogging torque,
W is a difference between the target cogging torque and a calculated value of the cogging torque after the permanent magnet has been moved, and
$C_0$ and $C_1$ are coefficients that are set according to a balance between the amount of movement of the magnet and the cogging torque.

6. The method according to claim 4, wherein the linear programming method minimizes (1) under a condition (2):

$$Z = C_0 \sum_{j=1}^{B} X_j + C_1 W \quad (1)$$

$$\left. \begin{array}{l} \sum_{j=1}^{B} a_{ij} X_j + \dfrac{W}{2} \geq -T_i - \dfrac{1}{2}\text{tole} + T_l \\ -\sum_{j=1}^{B} a_{ij} X_j + \dfrac{W}{2} \geq T_i - \dfrac{1}{2}\text{tole} - T_l \\ X_j, W \geq 0 \end{array} \right\} \quad (2)$$

wherein
B represents a number of magnets,
i represents a point at which the cogging torque is measured,
j represents a position of the magnet,
$X_j$ is an amount of movement of a j-th magnet,
$T_i$ is the cogging torque at an i-th point before adjusting the cogging torque,
$a_{ij}$ is an amount of change in the cogging torque at the i-th point per amount of movement of the j-th magnet when the j-th magnet is moved,
$T_1$ is a loss torque before adjusting the cogging torque,
tole is a target cogging torque,
W is a difference between the target cogging torque and a calculated value of the cogging torque after the permanent magnet has been moved, and
$C_0$ and $C_1$ are coefficients that are set according to a balance between the amount of movement of the magnet and the cogging torque.

* * * * *